(12) United States Patent
Gavrilov et al.

(10) Patent No.: US 8,681,606 B2
(45) Date of Patent: *Mar. 25, 2014

(54) IMPLEMENTING REDUNDANCY ON INFINIBAND (IB) NETWORKS

(75) Inventors: Constantine Gavrilov, Tel Aviv (IL); Zorik Machulsky, Gesher HaZiv (IL); Leah Shalev, Zichron-Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/221,067

(22) Filed: Aug. 30, 2011

(65) Prior Publication Data

US 2013/0051222 A1  Feb. 28, 2013

(51) Int. Cl.
*H04L 12/26* (2006.01)

(52) U.S. Cl.
USPC ........... 370/225; 370/352; 370/355; 370/390; 370/400; 370/428

(58) Field of Classification Search
USPC ......... 370/352, 353, 355, 356, 357, 366, 360, 370/390, 393, 395.31, 395.3, 400, 428, 429
See application file for complete search history.

(56) References Cited

U.S. PATENT DOCUMENTS

| | | | |
|---|---|---|---|
| 7,627,780 B2* | 12/2009 | Davies | 714/13 |
| 7,783,788 B1* | 8/2010 | Quinn et al. | 710/8 |
| 2003/0158992 A1* | 8/2003 | Ajanovic et al. | 710/305 |
| 2004/0054866 A1* | 3/2004 | Blumenau et al. | 711/202 |
| 2004/0062266 A1* | 4/2004 | Rojas et al. | 370/447 |
| 2004/0081186 A1* | 4/2004 | Warren et al. | 370/419 |
| 2005/0033804 A1* | 2/2005 | Iwami et al. | 709/203 |
| 2005/0044221 A1* | 2/2005 | Venkatanarayan et al. | 709/225 |
| 2005/0102557 A1* | 5/2005 | Davies et al. | 714/11 |
| 2005/0207105 A1* | 9/2005 | Davies | 361/683 |
| 2006/0107089 A1* | 5/2006 | Jansz et al. | 714/5 |
| 2008/0031249 A1* | 2/2008 | Valtchev et al. | 370/392 |

OTHER PUBLICATIONS

Khalid M. Ansari et al., "Implementing Cisco InfiniBand on IBM BladeCenter," Redpaper, Oct. 2007, 174 pages.
Rainer Finocchiaro et al., Low-Latency Linux Drivers for Ethernet over High-Speed Networks, IAENG International Journal of Computer Science, 36:4, IJCS_36_4_12, Nov. 19, 2009, 16 pages.
Gururaj et al., "Oracle® Fusion Middleware—Exalogic Enterprise Deployment Guide, EL X2-2, E18479-06," Jun. 2011, 174 pages.

* cited by examiner

*Primary Examiner* — Ian N Moore
*Assistant Examiner* — Phong La
(74) *Attorney, Agent, or Firm* — Griffiths & Seaton PLLC

(57) ABSTRACT

Systems and physical computer-readable storage medium are provided to improve efficiency of systems operating on internet protocol (IP) over Infiniband (IB) networks. In an embodiment, by way of example only, a method is provided for implementing redundancy for IB networks. The method includes detecting a failure at a first source port of a source node having a plurality of source ports, selecting a new source port, sending an address resolution protocol (ARP) message to one or more other nodes in communication with the source node including an IP address of the source node and IB address of the new source port of the source node, and re-balancing host traffic.

15 Claims, 11 Drawing Sheets

IMPLEMENTING REDUNDANCY ON INFINIBAND (IB) NETWORKS

BACKGROUND OF THE INVENTION

1. Field of the Invention

The present invention relates in general to InfiniBand networks, and more particularly, to methods of operating over IB networks.

2. Description of the Related Art

Input/output (I/O) networks, such as system buses, can be used for the processor of a computer to communicate with peripherals such as network adapters. However, constraints in the architectures of common I/O networks, such as Ethernet, limit the overall performance of computers. As a result new types of I/O networks have been introduced.

One new type of I/O network is known and referred to as the InfiniBand network. The InfiniBand network replaces Ethernet currently found in computers with a packet-switched network, complete with zero or more routers. A host channel adapter (HCA) couples the processor to a subnet, and target channel adapters (TCAs) couple the peripherals to the subnet. The subnet typically includes at least one switch, and links that connect the HCA and the TCAs to the switches. For example, a simple InfiniBand network may have one switch, to which the HCA and the TCAs connect through links. Topologies that are more complex are also possible.

InfiniBand networks can interconnect with communication networks. For instance, an Ethernet network adapter may be installed that enables communication over an Ethernet network, which is a common type of communication network. The network adapter has its own TCA for coupling to an InfiniBand network. The InfiniBand specification provides a raw datagram mode of communication to bridge packets received from an Ethernet network for transmission over an InfiniBand network, and vice-versa.

InfiniBand networks provide for communication between TCAs and HCAs in a variety of different manners. In the InfiniBand network data flows between end nodes on logical connections known as Queue Pairs (QPs) across a switched point-to-point fabric. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

SUMMARY OF THE INVENTION

InfiniBand networks allow for a number of different transport services, including reliable and unreliable connections, reliable and unreliable datagrams, and raw packet support. In unreliable connections and datagrams, acknowledgments are not generated. Thus, latency in such connections and datagrams and throughput performance may be improved.

Methods, systems, and physical computer-readable storage medium are provided to improve efficiency of systems operating on internet protocol (IP) over Infiniband (IB) networks. In an embodiment, by way of example only, a method is provided for implementing redundancy for IB networks. The method includes detecting a failure at a first source port of a source node having a plurality of source ports, selecting a new source port, sending an address resolution protocol (ARP) message to one or more other nodes in communication with the source node, the ARP message including an IP address of the source node and an IB address of the new source port, and re-balancing host traffic.

In another embodiment, by way of example only, an Infiniband system includes a plurality of nodes, each node including more than one port, an IB switch connected to the plurality of nodes, and a processor configured to detect a failure at a first port of a first node, to select a new source port, to send an address resolution protocol (ARP) announce message to one or more nodes of the plurality of IB nodes in communication with the first node, the ARP announce message including an address of an IP address of the source node and an IB address of the new source port of the first node, and to re-balance host traffic across the plurality of IB nodes.

In still another embodiment, by way of example only, a physical computer-readable storage medium comprising a computer program product for implementing redundancy for Infiniband (IB) networks is provided. The physical computer-readable storage medium comprises computer code for detecting a failure at a first source port of a source node having a plurality of source ports, computer code for selecting a new source port, computer code for sending an address resolution protocol (ARP) announce message to one or more other nodes in communication with the source node, the ARP announce message including an IP address of the source node and an IB address of the new source port of the source node, and computer code for re-balancing host traffic.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide methods for improving efficiency and reducing latency in IP over IB networks (IPOIB). The embodiments use multiple ports to achieve redundancy. In an embodiment, a method includes detecting a failure at a first source port of a source node having a plurality of source ports, selecting a new source port, sending an address resolution protocol (ARP) message to one or more other nodes in communication with the source node regarding an IP address of the source node and an IB address of the new source port of the source node, and re-balancing host traffic.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
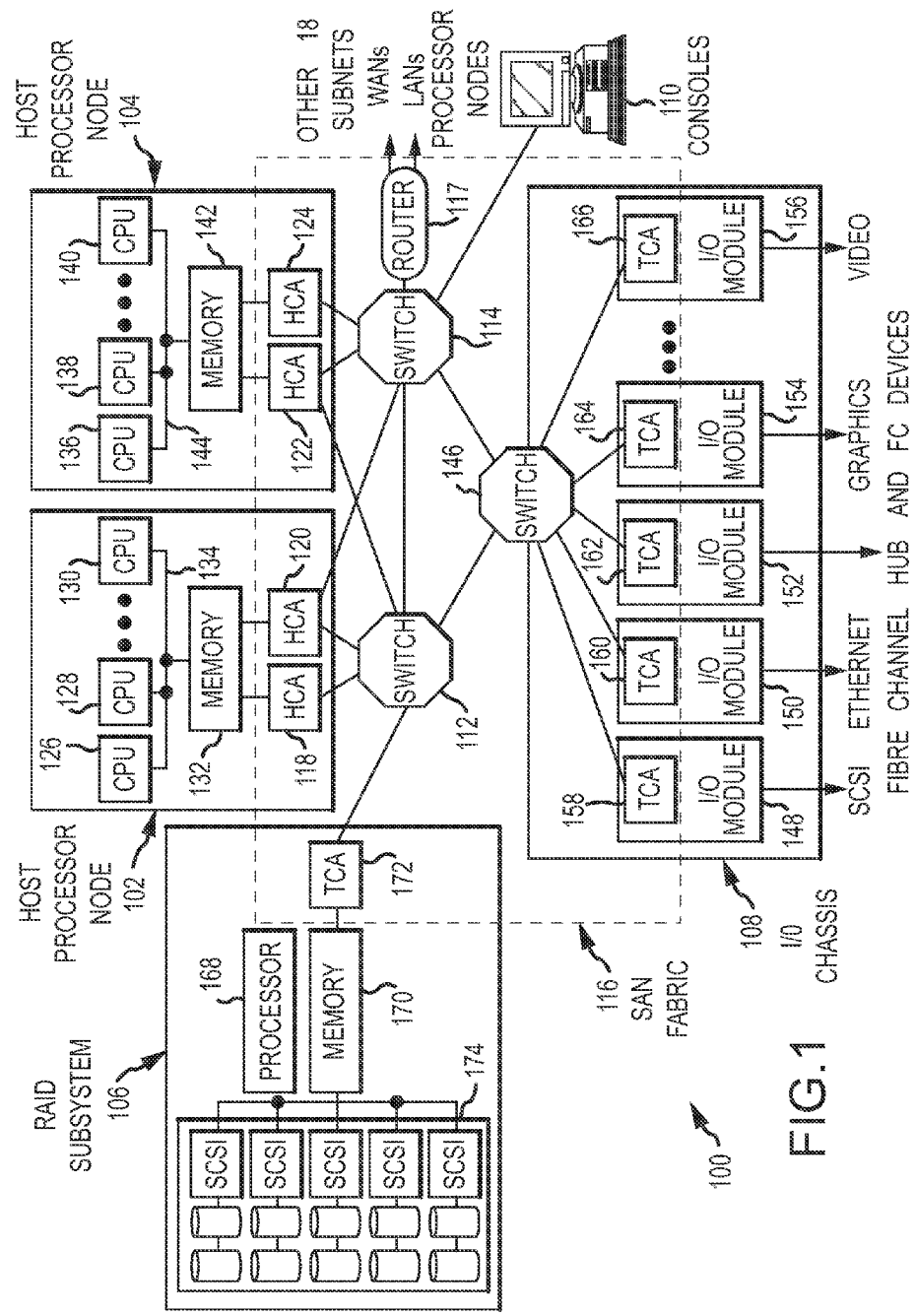
FIG. 1 is a diagram of a distributed internet protocol (IP) over Infiniband (IB) system, according to an embodiment.

FIG. 1 is a diagram of a distributed computer system, according to an embodiment. The distributed computer system represented in FIG. 1 takes the form of a System Area Network (SAN) 100 and is provided merely for illustrative purposes. Exemplary embodiments of the present invention described below can be implemented on computer systems of numerous other types and configurations. For example, computer systems implementing the exemplary embodiments can range from a small server with one processor and a few input/output (I/O) adapters to massively parallel supercomputer systems with hundreds or thousands of processors and thousands of I/O adapters.

Referring to FIG. 1, a SAN 100 is a high-bandwidth, low-latency network for interconnecting nodes within a distributed computer system. A node is any component attached to one or more links of a network and forming the origin and/or destination of messages within the network. In the example depicted in FIG. 1, the SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can interconnect any number and any type of independent processor nodes, I/O adapter nodes, and I/O device nodes. Any one of the nodes can function as an end node, which is herein defined to be a device that originates or finally consumes messages or packets in SAN 100. In exemplary embodiments, an error handling mechanism in distributed computer systems is present in which the error handling mechanism allows for reliable connection and/or communication between end nodes in distributed computing systems, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through SAN 100. The trailer generally contains control and cyclic redundancy check (CRC) data to verify that packets are not delivered with corrupted contents.

The SAN 100 depicted in FIG. 1 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low-latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes three Infiniband switches 112, 114, and 146, and router 117. A switch is a device that connects multiple links together and allows routing of packets from one link to another link within a subnet using a small header destination local identifier (DLID) field. A router is a device that connects multiple subnets together and is capable of routing packets from one link in a first subnet to another link in a second subnet using a large header destination globally identifier (DGID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In exemplary embodiments, each CA is an endpoint that implements the CA interface in sufficient detail to source or sink packets transmitted on SAN fabric 116. Host processor node 102 contains multiple CAs or ports in the form of Host Channel Adapters (HCAs) and 120. The terms "host processor node," "source node," and "host" may be used interchangeably herein. Host processor node 104 contains HCAs 122 and 124 each having multiple ports. Host processor node 102 also includes central processing units 126-130 and a memory 132 interconnected by bus system 134. Host processor node 104 similarly includes central processing units 136-140 and a memory 142 interconnected by a bus system 144. The ports of the HCAs 118 and 120 provide a connection from host processor node 102 to switch 112; while ports of the HCAs 122 and 124 provide a connection from host processor node 104 to switches 112 and 114. Here, the multiple ports of the host processor nodes 102 are illustrated as being connected to a single switch 112, 114 and to multiple switches 112, 114. In other embodiments, the nodes 102 can be connected to a single switch 112, 114 or to multiple switches 112, 114. In principle, each HCA can have multiple ports, one node can have multiple HCAs. Accordingly, each node has multiple ports.

In exemplary embodiments, an HCA is implemented in hardware. In this implementation, the HCA hardware offloads much of the central processing unit I/O adapter communication overhead. This hardware implementation of the HCA also permits multiple concurrent communications over a switched network without the traditional overhead associated with communication protocols. In an embodiment, the HCAs and SAN 100 in FIG. 1 provide the I/O and IPC consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules 148-156 take the form of adapter cards. Example adapter cards illustrated in FIG. 1 include a SCSI adapter card for I/O module 148, an adapter card to fibre channel hub and fibre channel arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter to couple the adapter cards to the SAN fabric. These modules contain target channel adapters (TCAs) 158-166. In the example depicted in FIG. 1, the RAID subsystem node 106 includes a processor 168, a memory 170, a TCA 172, and multiple redundant and/or striped storage disk units 174. TCA 172 can be a fully functional HCA.

Figure 2:
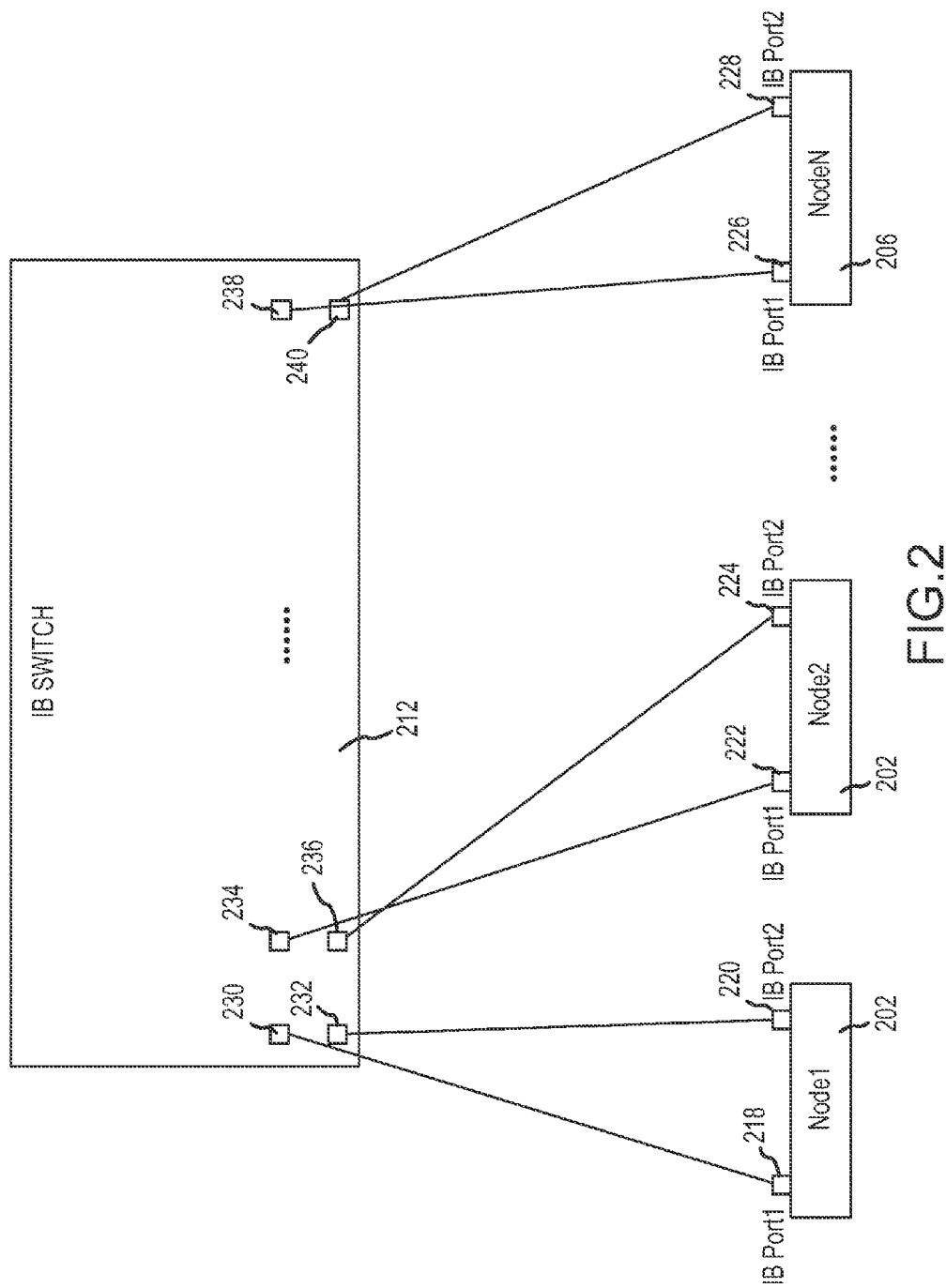
FIG. 2 is a simplified schematic of multiple nodes connected to a single IB switch, according to an embodiment.

As briefly noted above, multiple HCAs (e.g., HCAs 118, 120, 122, 124) can be connected to one or more switches (e.g., switches 112, 114). FIG. 2 is a simplified schematic of multiple nodes 202, 204, 206 connected to a single IB switch 212, according to an embodiment. The HCAs of each node includes multiple IB ports 218, 220, 222, 224, 226, 228. For example, Node 202 includes IB ports 218, 220, Node 204 includes IB ports 222, 224, and Node 206 includes IB ports 226, 228. Although each of the nodes 202, 204, 206 has two IB ports, more IB ports can be included on each node in other embodiments. All of the IB ports 218, 220, 222, 224, 226, 228 are connected to endpoints at IB switch 212. In an embodiment, the IB switch 212 includes switch ports 230, 232, 234, 236, 238, 240 that correspond to a respective IB port 218, 220, 222, 224, 226, 228.

Figure 3:
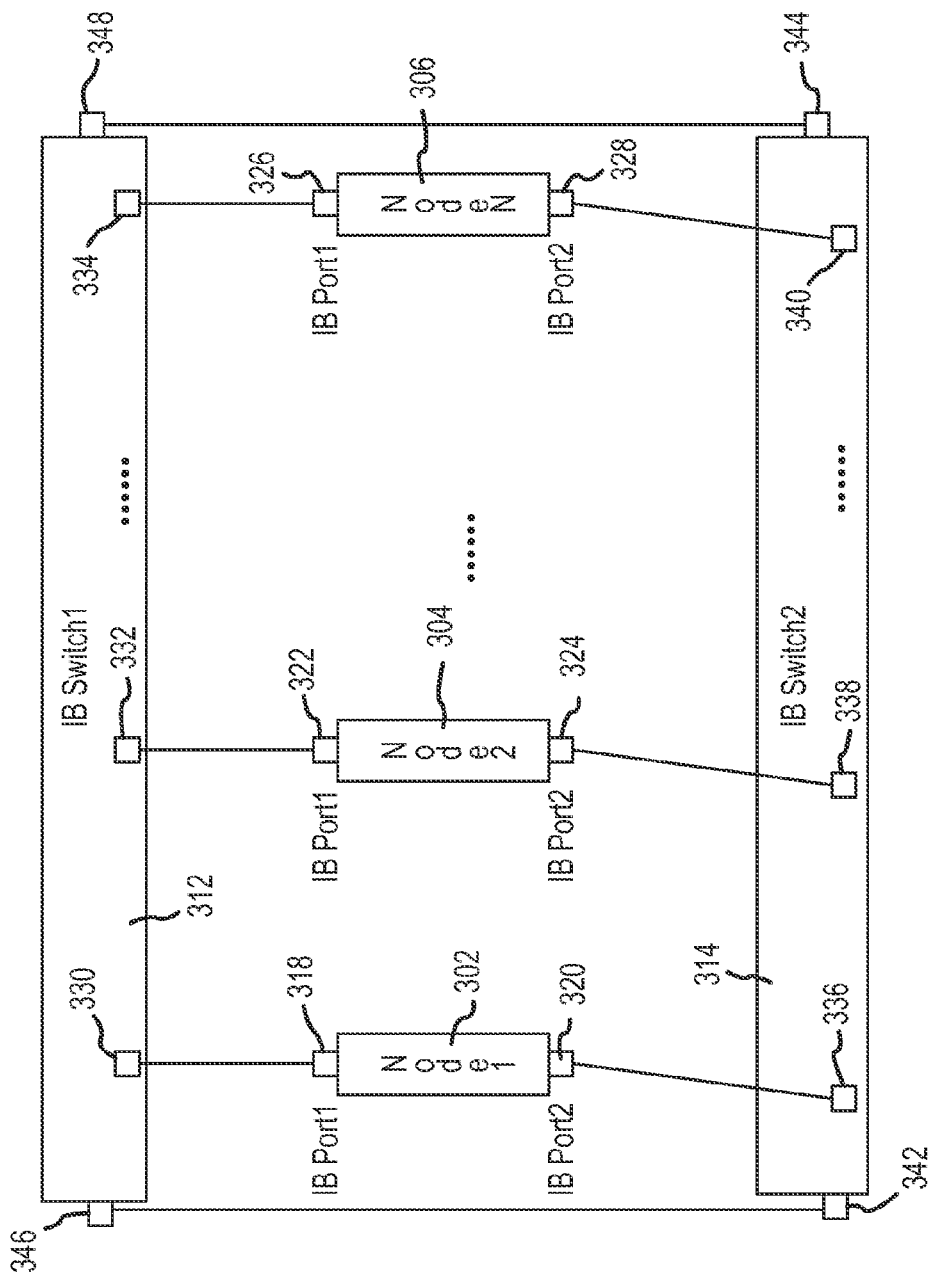
FIG. 3 is a simplified schematic of multiple odes connected to multiple IB switches, according to an embodiment.

FIG. 3 is a simplified schematic of multiple nodes 302, 304, 306 connected to multiple IB switches 312, 314, according to an embodiment. The HCAs of each node includes multiple IB ports 318, 320, 322, 324, 326, 328. For example, Node 302 includes IB ports 318, 320, Node 304 includes IB ports 322, 324, and Node 306 includes IB ports 326, 328. Although each of the nodes 302, 304, 306 has two IB ports, more IB ports can be included on each node in other embodiments. In an embodiment, one IB port 318, 322, 326 from each node 302, 304, 306 is connected to IB switch 312, and another IB port 320, 324, 328 from each node 302, 304, 306 is connected to IB switch 314. In an embodiment, the IB switch 312 includes switch ports 330, 332, 334 that correspond to a respective IB port 318, 322, 326, and IB switch 314 includes switch ports 336, 338, 340 that correspond to respective ports IB port 320, 324, 328. Additionally, the IB switches 212, 214 can be connected to each other via switch ports 342, 344, 346, 348.

Although three nodes are shown each including two ports, and two switches are shown each including five switch ports, more nodes, ports, switches, and/or switch ports can be included in other embodiments.

In any case, to reduce latency and improve efficiency of the IP over Infiniband network, the nodes (e.g., nodes 102, 104, 202, 204, 206, 302, 304, 306) operate by implementing address resolution protocol (ARP). For example, ARP messages, such as ARP requests, ARP replies, and ARP announcements, are communicated between nodes of the network. One or more of the nodes designated for receiving an ARP message can serve as a destination node. The destination nodes have multiple corresponding destination ports over which to receive the ARP messages. The information from ARP messages is entered into a two-level ARP cache, which is used as a mapping table for finding addresses of the nodes.

Figure 4:
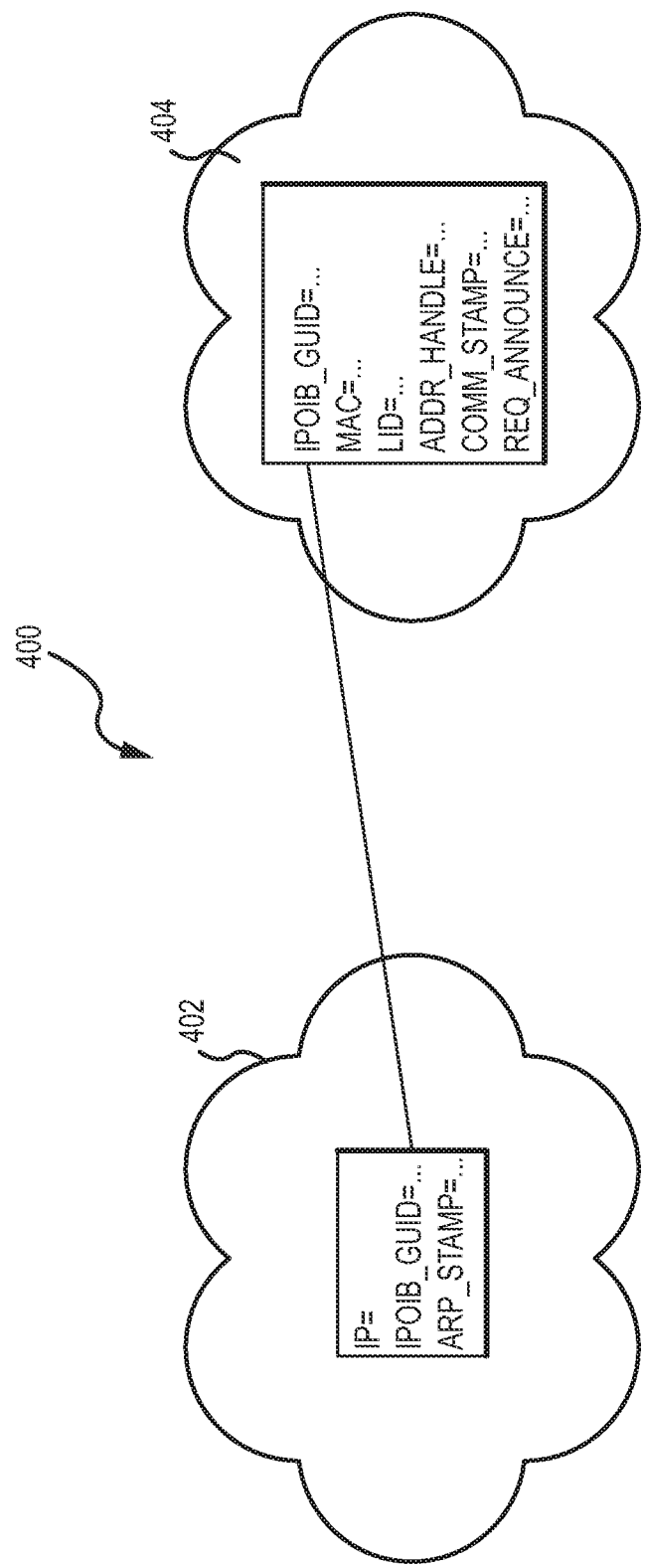
FIG. 4 is a diagram of a two-level address resolution protocol (ARP) cache for use by the distributed computer system, according to an embodiment.

FIG. 4 is a diagram of a two-level address resolution protocol (ARP) cache 400 for use by the distributed computer system 100 (FIG. 1), according to an embodiment. Each node (e.g., nodes 102, 104, 202, 204, 206, 302, 304, 306) of the system includes an ARP cache 400 and uses the ARP cache 400 to match source ports (e.g., ports 218, 220, 222, 224, 226, 228, 318, 320, 322, 324, 326, 328) with destination ports (e.g., ports 218, 220, 222, 224, 226, 228, 318, 320, 322, 324, 326, 328), in an embodiment.

In an embodiment, the ARP cache 400 is a table that maps IP addresses with hardware addresses and includes a first level ARP cache 402 and a second level ARP cache 404. The first level ARP cache 402 can include entries including an IP address of a node that has previously sent an ARP request over the system. The first level ARP cache 402 uses an IP address of the node as a key to find an IP over IB global unique identifier (GUID) for the node. The first level cache also includes pending ARP requests for IP addresses of nodes, which are time-stamped with a time the ARP request was last sent, in an embodiment.

The second level ARP cache 404 uses the IP over IB GUID as a key to identify corresponding IB address information for a node. The IB address information can include remote media access control (MAC) addresses (e.g., remote queue pair numbers (QPN) and remote global identifiers (GID)), remote local identifiers (LID), local source ports matched with the node LID, cached address handles used to communicate with the LID, and ARP announce flags (i.e., status flags). The entries can be time-stamped with a time of last communication.

The two-level ARP cache 400 can have a predetermined storage limit. For example, the ARP cache 400 can be 1024 KB. In another embodiment, the ARP cache 400 is larger or smaller than the aforementioned size. In any case, the size of the ARP cache 400 can be managed by removing entries having time stamps that are older than a predetermined time stamp.

ARP is used to resolve destination address from IP address. For example, generally, when ARP requests are sent, a sender source IP, sender source MAC address, and known destination IP address is included. The destination MAC address may be unknown. An ARP reply to the request from the destination includes the destination IP and destination MAC.

MAC addresses for IP over Infiniband are 20 bytes in length, the first byte being flags of the implementation, the next 3 being QP number, and next 16 are the GID address. The flags byte can be used to distinguish the "standard" IPOIB implementation from one that supports multi-port extensions. Only the first bit is reserved for use by standard "implementations" (indicating connected mode support). Thus, the second bit in flags field of the MAC address is used to indicate that the node supports multiport extensions.

ARP messages can be sent to a standard multicast group that is used to send and receive these messages, and replies received by a sender can be unicast from the destination. At times, the ARP messages are sent to "extended" groups. For example, those destinations that have multiport aware implementations may be distinguished from other destinations and can be referred to as "extended." The other destinations are referred to as "standard." These extended destinations can join an "extended" group and each can include an additional IP over IB GUID as part of the ARP packets it sends. Thus, when an "extended" ARP message is broadcasted, only those destinations that have joined the extended group will receive the message. Those that do not support the extension are "standard" and do not receive extended ARP messages. In addition, since multiport implementations will have the second bit of their MAC addresses set, other multiport implementations will be able to ignore standard ARP queries from these implementations and will wait for extended queries from them. Thus, the use of ARP as described allows interoperability with standard implementations.

Figure 5:
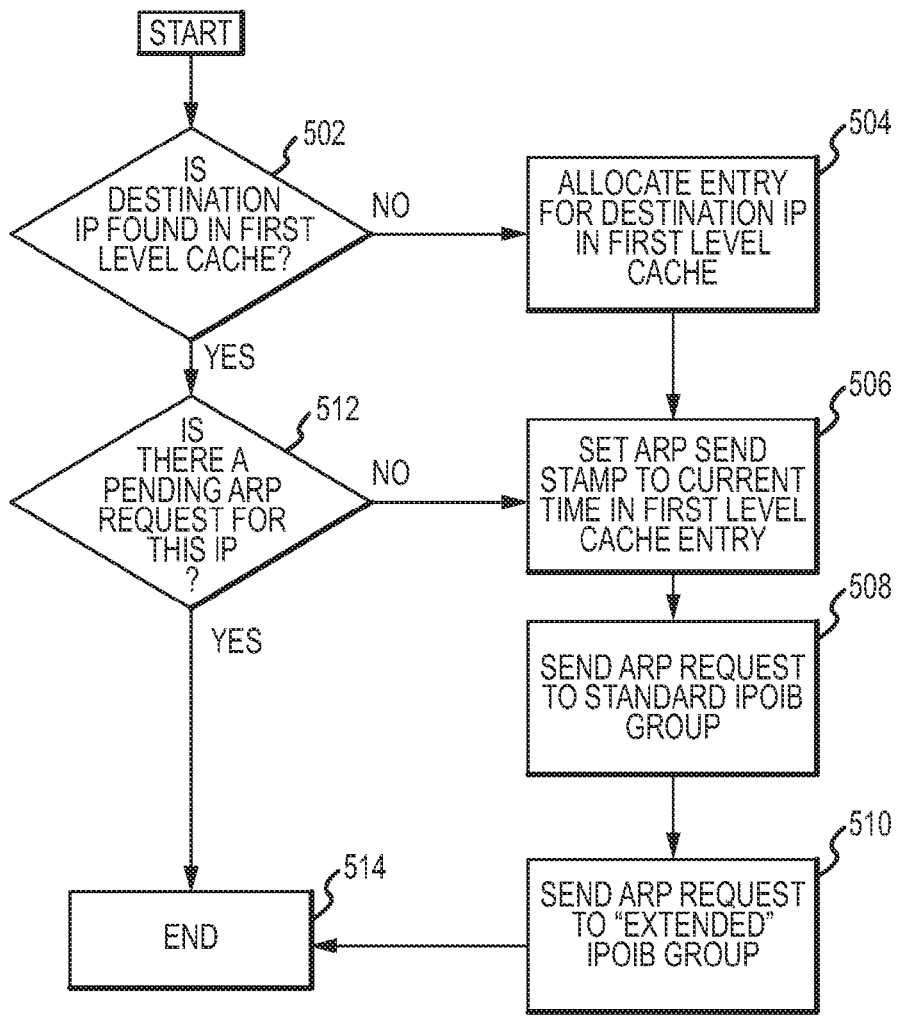
FIG. 5 is a diagram of a method of sending an ARP request, according to an embodiment.

The two-level ARP cache 400 is useful when a source node wants to communicate with a destination node. FIG. 5 is a diagram of a method 500 of sending an ARP request, according to an embodiment. First, a determination is made as to whether a destination IP address is found in a first level of an ARP cache, step 502. If not, an entry is allocated into the first level of the ARP cache for the destination IP address, step 504. Then, an ARP send time stamp is stored in the first level of the ARP cache, step 506. Next, an ARP request is sent to a standard IP over IB group, step 508. An extended ARP request is then sent to an "extended" IP over IB (IPoIB) group, step 510. Thus, in step 508, those nodes having that do not support the extensions receive the ARP request sent to the standard IP over IB group, but do not receive the ARP request sent in step 510. Those nodes that do support the extensions receive the ARP requests sent to both the standard and "extended" IP over IB group in step 510 but know to ignore the standard request.

Returning to step 502, if the destination IP address is found in the first level cache, a determination is made as to whether a pending ARP request associated with the destination IP address is in the first level cache, step 512. If not, the method 500 moves to step 506 and iterates through to step 510. If so, the method 500 ends.

Figure 6:
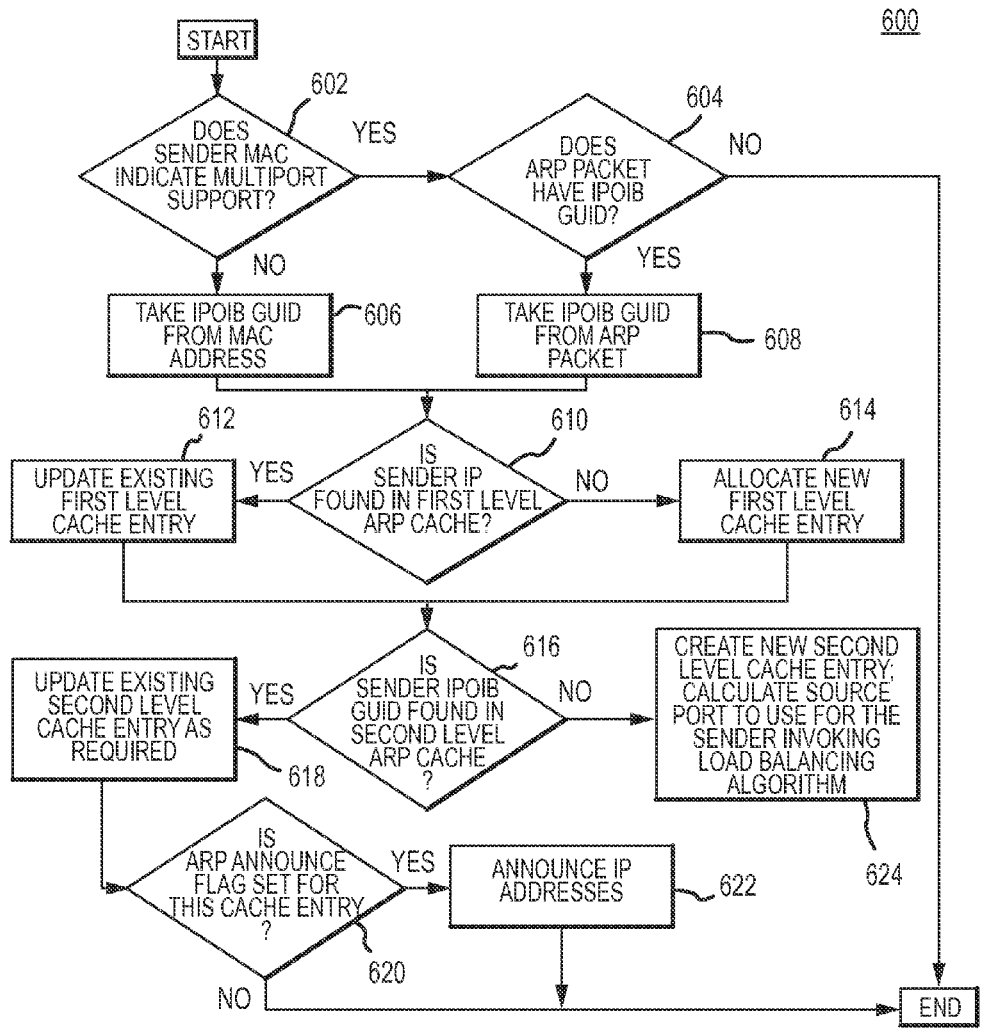
FIG. 6 is a diagram of a method of handling ARP replies and ARP announces, according to an embodiment.

In response to the ARP request, a node may send an ARP reply. At other times, a node may send an ARP announce. FIG. 6 is a flow diagram of a method 600 of handling ARP replies and ARP announces, according to an embodiment. In an embodiment, a determination is made as to whether a MAC address of a sender of an ARP packet indicates multiport support, step 602. If so, another determination is made as to whether the ARP packet has an IP over IB GUID, if so, the IP over IB GUID is taken from the ARP packet, step 608, and the method 600 moves to step 610. If not, the method 600 ends. Returning to step 602, if the sender MAC does not indicate multiport support, the IP over GUID is taken from the MAC address, step 606, and the method then moves to step 610.

At step 610, a determination is made as to whether a sender IP address can be found in a first level ARP cache. For example, the first level ARP cache is reviewed to find a corresponding IP over IB GUID for the IP address of the sender. If the IP address is found, then the existing entry in the first level ARP cache including the corresponding IP address is updated, step 612, and the method 600 moves to step 616.

If the IP address is not found, a new entry is allocated to the first level cache, step 614. In an embodiment, the new entry includes the corresponding IP address and IP over IB GUID of the sender. Then, the method moves to step 616.

At step 616, a determination is made as to whether the sender IP over IB GUID is found in a second level ARP cache. If so, the entry found in the second level ARP cache is updated, step 618. Next, a determination is made as to whether an ARP announce flag is set for the entry, step 620. If so, the IP addresses of the receiver (local node) are announced, step 622. If not, then the method 600 ends.

Returning to step 616, if the sender IP over IB GUID is not found in the second level ARP cache, a new entry is made in the second level ARP cache including the sender IP over IB GUID, and a calculation is made to determine which source port is to be used by the sender, step 624. In an embodiment, the calculation can be performed by invoking a load balancing algorithm.

Figure 7:
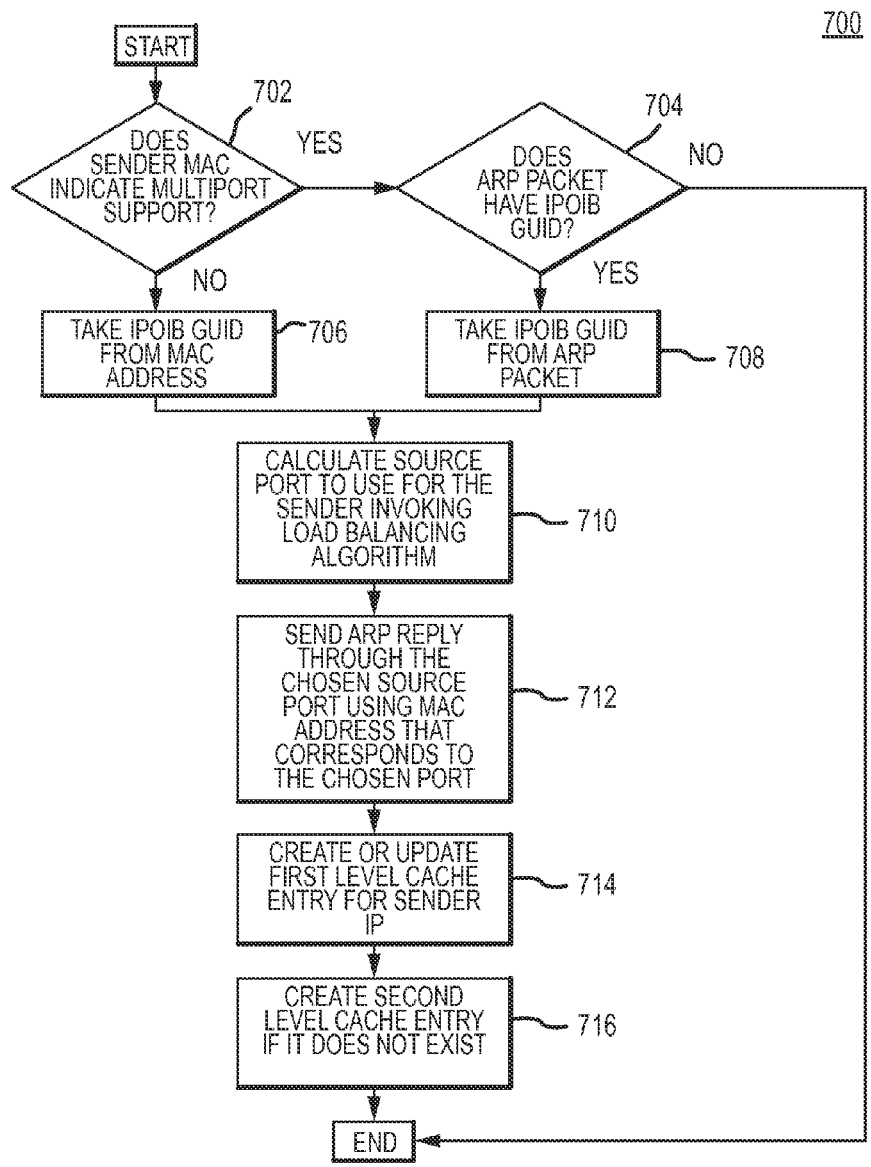
FIG. 7 is a diagram of a method of sending an ARP reply, according to an embodiment.

When an ARP reply is to be sent, method 700 illustrated in FIG. 7 may be employed. In an embodiment, a determination is made as to whether a MAC address of a sender of an ARP packet indicates multiport support, step 702. If so, another determination is made as to whether the ARP packet has an IP over IB GUID, if so, the IP over IB GUID is taken from the ARP packet, step 708 and the method 700 moves to step 710. If not, the method 700 ends. Returning to step 702, if the sender MAC does not indicate multiport support, the IP over GUID is taken from the MAC address, step 706, and the method then moves to step 710.

At step 710, a calculation is made to determine which source port is to be used for communication with the sender of the request. In an embodiment, the calculation can be performed by invoking a load balancing algorithm. After the source port is chosen, an ARP reply is sent through the chosen source port using the MAC address that corresponds to the chosen source port, step 712. An entry related to the sender IP address and IP over IB GUID is then either created or updated in the first level ARP cache, step 714. An entry in the second level ARP cache is created also, if one does not already exist, step 716.

A fully resolved second level cache entry cannot be created for multiport clients at this point. A source port to use for communication with the sender of the request can be calculated using the load balancing algorithm, and the IPOIB GUID of the sender is also known. However, if the sender of the ARP request supports multiport extension, the address of its Infiniband port selected for communication ("selected port") is not known. This is because the ARP request was sent from a port joined to a multicast group that is not necessarily the same as the selected port.

An entry is made into the second level ARP cache including information from the sender's ARP request (otherwise, there is a chance that the sender will not be notified of changes if a local port fails). If the second cache level entry does not exist for the sender of the ARP request and the sender supports multiport extension (as indicated by second bit of its MAC address taken from ARP request), a partially resolved second level ARP cache entry will be created. The source port, the destination lid and IPOIB GUID will be updated, and the MAC address can be marked as unresolved (for example by setting all bits of flags byte). This will make the entry unresolved for the purposes of ARP lookup (IP to IB address), but will allow tracking of the sender to thereby allow updating the sender about an imminent failure of a local port that happens before a fully resolved ARP entry for the sender is added to the second level ARP cache.

On the other hand, fully resolved entries can be added to the second level ARP cache for standard clients. This is because those standard clients use the same port for sending ARP requests and data, and the address of the sender is known from the from its sent ARP request.

Figure 8:
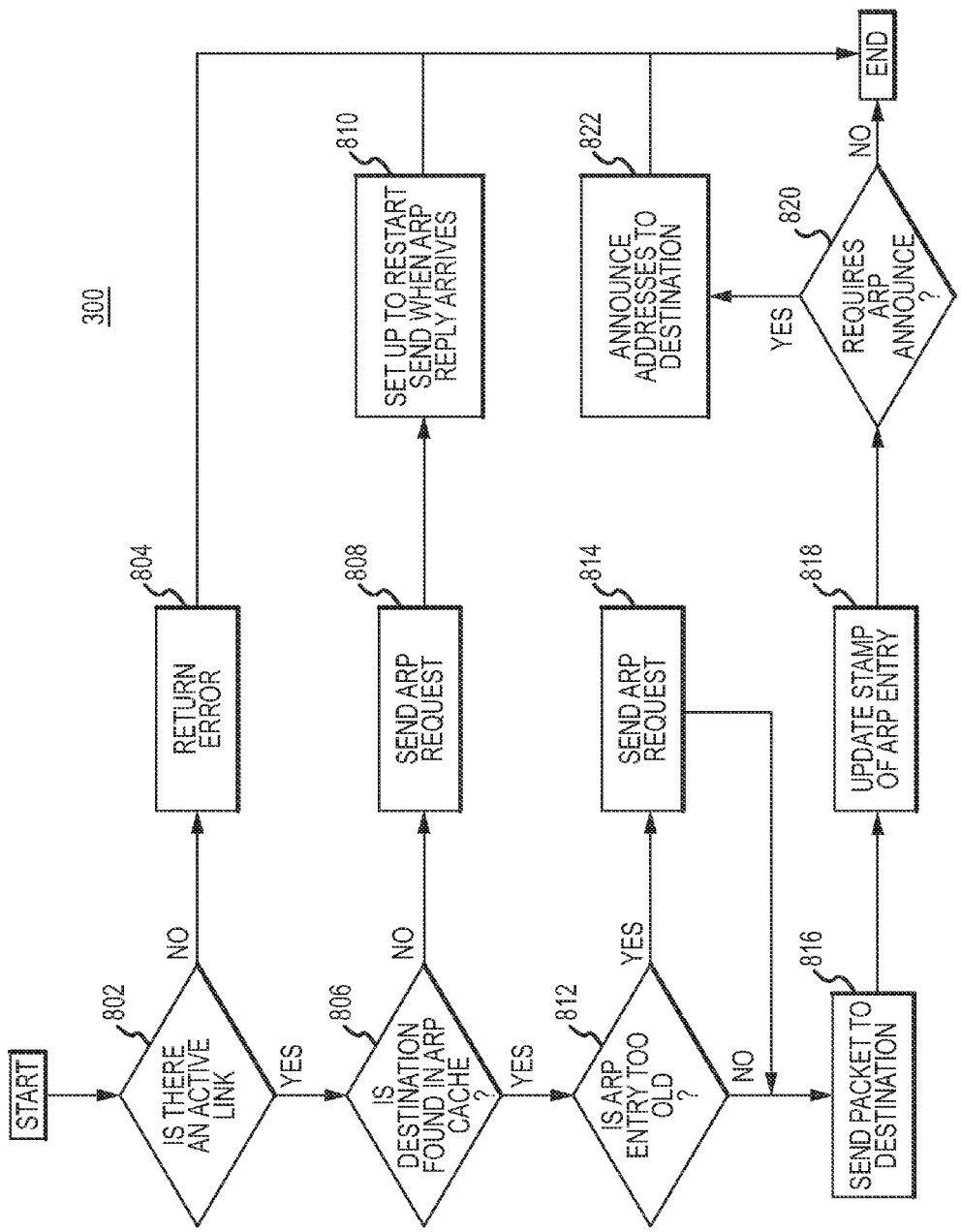
FIG. 8 is a flow diagram of a method of sending a data packet from a source node to a destination node, according to an embodiment.

Generally, the methods for handling ARP messages (e.g., replies, requests, announces) can be used to facilitate address resolution when sending data packets from one node to another. FIG. 8 is a flow diagram of a method 800 of sending a data packet from a source node to a destination node, according to an embodiment. The method 800 starts by detecting the number of active links on the source node, step 802. In particular, the source node determines whether one or more of its associated ports are in a LINKUP state. If there is no active link, an error signal is returned, step 804 (and no data packet is sent as a result). For example, the source node may detect an asynchronous event on a queue pair object to return an error signal. Thus, at any given time, the source can know the number of active links, and which links are active and which links are not active.

Alternatively, if an active link is present, a determination is made as to whether a particular IP address of the destination node is found in the ARP cache, step 806. If not, the source node sends an ARP request to all other nodes for the particular IP address, step 808. For example, the process for sending the ARP request can be similar to method 500 of FIG. 5. In any case, the data packet is sent after an ARP reply arrives from an appropriate destination node, step 810. Specifically, the destination node having a matching address to the particular IP address sends a reply to the source node.

Returning to step 806, if the particular IP address is found in the ARP cache, a determination is made as to whether the entry related to the particular IP address is older than a predetermined time stamp, step 812. If not, the data packet is sent to the destination node having the particular IP address, step 816. If it is, then the source node sends an ARP request to all other nodes for the particular IP address, step 814, and sends the data packet to the appropriate destination node, step 816. The time stamp value of last communication is then updated to a current time, step 818.

In some cases, a determination is made as to whether an ARP announce is required, step 820. If so, an ARP announce is sent from the source node to the destination node, step 822. The ARP announce may include the addresses of the local source port to inform the destination node where to send messages.

Figure 9:
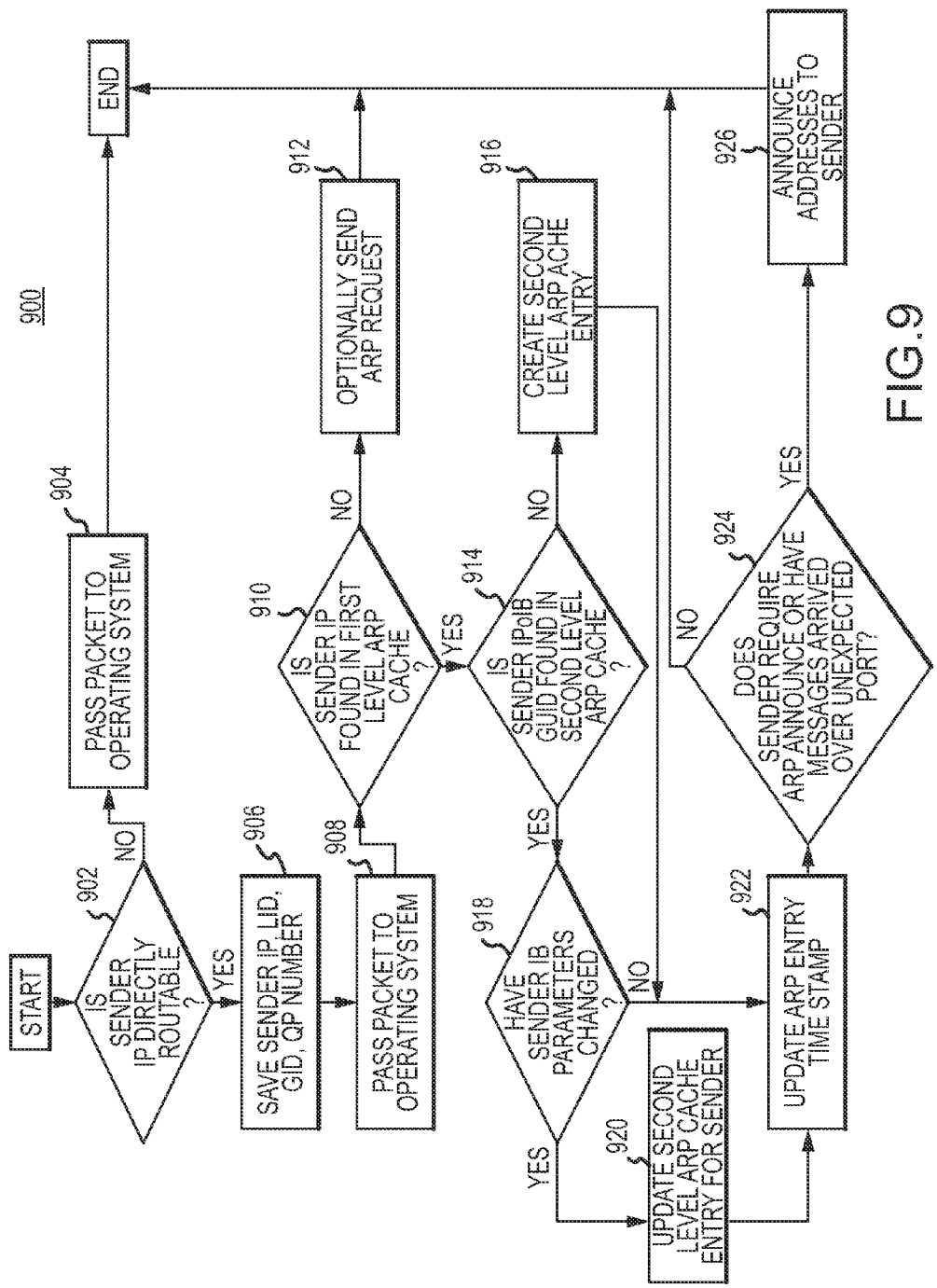
FIG. 9 is a flow diagram of a method of receiving a data packet at the source node, according to an embodiment.

In another embodiment, the methods of handling ARP messages are used for generally receiving data packets. FIG. 9 is a flow diagram of a method 900 of receiving a data packet at the source node, according to an embodiment. The method 900 starts when the source node receives a data packet from the destination node ("sender"). Next, a determination is made as to whether an IP address of the sender is directly routable, step 902. For example, the sender IP is directly routable if a packet does not need an IP router to reach destination and is routed by IB switch alone. If not, then the data packet from the source node is passed to the operating system, step 904. If so, then the sender IP address, LID, GID, and QPN are saved temporarily, step 906. The data packet is then passed to the operating system, step 908.

To maintain an up-to-date ARP cache, next a determination is made as to whether the sender IP address is found in a first level of the ARP cache, step 910. If not, an ARP request can be sent to the sender, step 912. If the sender IP address is found in the first level of the ARP cache, a determination is made as to whether the IP over IB GUID of the sender is found in a second level of the ARP cache, step 914. If not, an entry is made into the second level of the ARP cache, step 916, and the entry is time stamped, step 922. If the IP over IB GUID of the sender is found, a determination is made as to whether the IB parameters of the sender have changed, step 918. If not, the time stamp of the entry related to the sender's IB parameters is updated to a current time, step 922. If so, then the entry related to the IB parameters of the sender are updated in the second level of the ARP cache, step 920, and the time stamp of the entry is updated to a current time, step 922.

Next, a determination is made as to whether the sender requires an ARP announce or if messages from the sender have arrived to the receiver (i.e., source node) over an unexpected port, step 924. If so, an ARP announce including the receiver's addresses are sent to the sender, step 926. If not, the method 900 ends.

Figure 10:
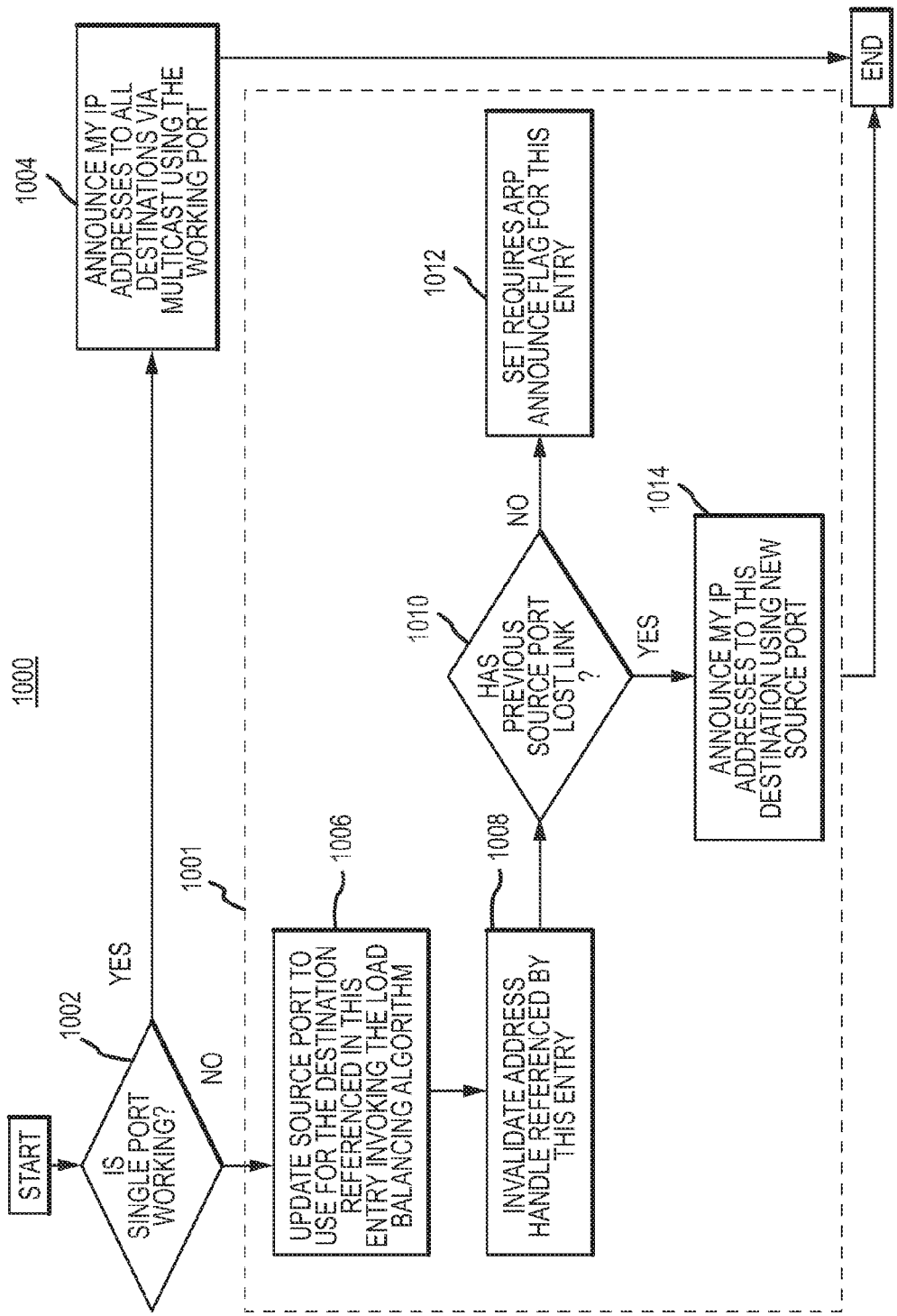
FIG. 10 is a flow diagram of a method of operating a distributed internet protocol (IP) over Infiniband (IB) system during a change in a state of a port, according to an embodiment.

Employing ARP messages is also useful when a change occurs in the state of ports (e.g., port failure, etc.) FIG. 10 is a flow diagram of a method 1000 of operating a distributed internet protocol (IP) over Infiniband (IB) network during a change in the state of a port, according to an embodiment. First, a determination is made as to whether a single port is operational, step 1002. In an embodiment, a failure at a port of a node is detected. In another embodiment, port activation is detected. If a single port is operational, the IP addresses of the source node are announced to all destination nodes via multicast over the operational port, step 1004.

If multiple ports are operational, traffic is rebalanced across the ports. In particular, for all entries found in a second level ARP cache of the node where the port change took place, loop 1001 is performed. Loop 1001 begins and the source port to use for a destination node referenced in an instant of second level ARP cache entry is updated by invoking the load balancing algorithm, step 1006. Next, an address handle referenced by the entry is invalidated, step 1008. In this way, association with the non-operational port is removed from the entry. Next, a determination is made as to whether the previous value references the source port has a lost link, step 1010. If not, an ARP announce flag is set for the entry, step 1012. If so, the IP addresses associated with the source node are announced to the destination node over the new source port, step 1014 Announce is made using ARP messages which include the sender MAC address that responds to the newly selected port.

In an embodiment, after the ARP packets are sent, host traffic across the ports and nodes is re-balanced. In particular, one or more destination nodes have been identified that communicate with the source node and one or more of them have been notified of a change from the failed port to the active port. According to an embodiment, the notification can be made to all of the other nodes. In another embodiment, the notification can be made to the nodes that have previously communicated with the source node. For example, each node that has communicated with the source node may have an entry in a global ARP cache, where each entry includes one or more of an IP address, local identifier, global identifier, and queue pair number of the node. Thus, an ARP message can be sent to those nodes having entries in the global ARP cache.

Figure 11:
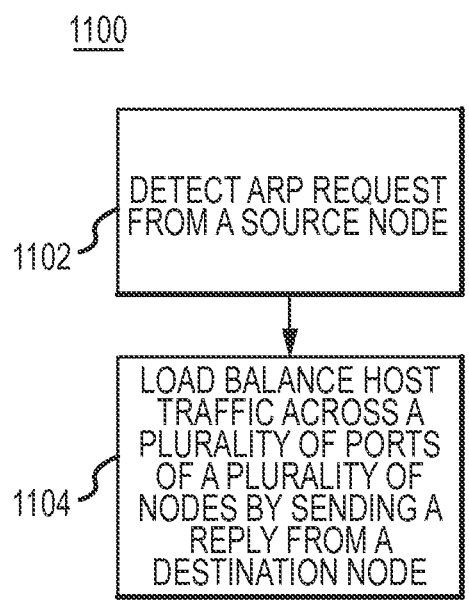
FIG. 11 is a flow diagram of a method of operating a distributed internet protocol (IP) over Infiniband (IB) system to load balance host traffic, according to another embodiment.

As mentioned previously, load-balancing host traffic across multiple ports of multiple hosts occurs in several methods handling ARP messages. FIG. 11 is a flow diagram of a method 1100 of operating a distributed internet protocol (IP) over Infiniband (IB) network to load balance host traffic, according to another embodiment. First, an ARP request is detected from a source node, step 1102. In an embodiment, the ARP request includes an IP address and data relating to a local source port of the source node to which to respond. In another embodiment, after an ARP reply is received, a determination is made as to whether the IP address of the source node is included in a first level of an ARP cache. If so, another determination is made as to whether an IP over IB GUID of the source node is included in a second level of the ARP cache. If not, then an entry from the ARP request is created in the ARP cache, in an embodiment. Additionally, data related to IB parameters of the source node can be updated in the second level of the ARP cache. Also, the entry is time stamped with a current time.

In any case, load-balancing of host traffic across a plurality of ports of a plurality of nodes is then performed by sending a unicast reply from a destination node to the port of the source node, step 1104. Generally, load-balancing decision is made by the sender of the ARP replies to the aforementioned ARP request and using the information in the ARP reply that the sender replies with. Load-balancing can occur when the source and destination nodes are connected by a single switch, in an embodiment. Here, a simple round robin balancing can be used where the local source port (PORT_N) to use with a given IP over IB GUID can be identified by using the following:

PORT_*N(DEST_GUID,*NACTIVE)=1+*DEST_GUID*%NACTIVE assuming NACTIVE is the number of functional local ports and local port numeration starts from 1

When the source and destination nodes are connected by multiple switches, each node has N IB ports, the system has N IB switches that are interconnected to form a single IB network. Each node is connected to all switches by:

---

IB port number 1 connected to switch-1
IB port number 2 connected to switch-2
...
IB port number N connected to switch-N

---

When all ports are active, two nodes perform a hash function that chooses the same source port number for a given pair of source and destination IP over IB GUIDs. Assuming consecutive IP over IB GUIDs are assigned to all nodes, a source port PORT_N (where source port numeration starts from 1) to use can be computed by:

PORT_*N(DEST_GUD,SRC_GUID,*NPORTS)=1+
(*DEST_GUID*+*SRC_GUID*)%NPORTS

When port failures or port reactivation occur, dynamic IPOIB GUIDs can be used. For example, low 32-bits of IPOIB GUID can represent unique destination node ID and these values are stored in the first level of the ARP cache, high 32-bits of IPOIB GUID are used to represent a bitmask of currently active ports (the full GUID is stored in a second level of the ARP cache). If the bitmask of active ports change, all known IPOIB destination nodes are notified. In other words, the port selection function becomes:

---

```
        PORT_N(DEST_GUID, SRC_GUID, NPORTS)
{
    DEST_LO = DEST_GUID & 0xffffffff;
    SRC_LO = SRC_GUID & 0xffffffff;
    DEST_HI = DEST_GUID >> 32;
    SRC_HI = SRC_GUID >> 32;
    NPORTS = POPCOUNT( SRC_HI & DST_HI);
    N = 1 + (DEST_LO+SRC_LO) % NPORTS;
    return FIND_NTH_SET_BIT(SRC_HI & DST_HI, N);
}
```

---

The POPCOUNT(X) function returns the number on non-zero bits in a 32-bit integer. The FIND NTH_SET_BIT(X,N) function returns the Nth non-zero bit in X (the numeration starts from 1).

Thus, after the source port is identified, an ARP announce or reply including the IP address and MAC address is sent from the source node to the destination node. If a destination node supports multiport extentions (as indicated by flags byte of its MAC address), an "extended" ARP message which contains the source node IPOIB GUID is sent to it. Otherwise, the standard ARP message is sent to the destination. Typically, the ARP reply or announce is sent via unicast to the destination node(s) and is sent over the source port identified for use above.

By employing the above-described procedures, the improved system can operate more efficiently than conventional systems. Specifically, by using ARP announcements and replies, redundancy and load-balancing can be achieved over multiple ports of multiple nodes. Although the procedures above are described in the context of SANs, it will be appreciated that the procedures are also applicable to other clustered network storage solutions that use Infiniband, such as network-attached storage (NAS) and the like.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. An Infiniband (IB) system comprising:
    a plurality of nodes, each node including more than one port;
    an IB switch connected to the plurality of nodes; and
    a processor configured
        to detect a failure at a first port of a first node;
        to select a new source port of the first node;
        to identify one or more destination nodes from the plurality of nodes to notify of the selected new source port of the first node, wherein to identify the one or more destination nodes, the processor is further configured to
            identify a corresponding internet protocol IP address of a destination node to an IP address of the first node,
            determine in a first level of an address resolution protocol (ARP) cache a corresponding IP over IB global unique identifier (GUID) of the destination node to the IP address of the destination node, and
            locate a corresponding IB address to the IP over IB GUID of the destination node in a second level of the ARP cache;
        to send an ARP announce message to the one or more destination nodes of the plurality of nodes in communication with the first node, the ARP announce message including the IP address of the first node and IB address of the new source port of the first node; and
        to re-balance host traffic across the plurality of nodes.

2. The Infiniband system of claim 1, further comprising a plurality of IB switches connecting at least two nodes.

3. The Infiniband system of claim 1, wherein each node includes a two-level ARP cache, the two level ARP cache has a first level and a second level, the first level includes a plurality of IP addresses and corresponding IP over IB GUIDs of at least one of other node of the plurality of nodes, and the second level includes the IP over IB GUIDs and corresponding IB addresses of the at least one other node of the plurality of nodes.

4. A physical, non-transitory computer-readable storage medium comprising a computer program product for implementing redundancy for Infiniband (IB) networks, the physical computer-readable storage medium comprising:
    computer code for detecting a failure at a first source port of a source node having a plurality of source ports;
    computer code for selecting a new source port from the plurality of source ports;
    computer code for identifying one or more destination nodes from a plurality of nodes in communication with the source node to notify of the selected new source port of the source node wherein identifying the one or more destination nodes includes:
        identifying a corresponding internet protocol (IP) address of a destination node to an IP address of the source node,
        determining in a first level of an address resolution protocol (ARP) cache a corresponding IP over IB global unique identifier (GUID) of the destination node to the IP address of the destination node, and
        locating a corresponding IB address to the IP over IB GUID of the destination node in a second level of the ARP cache;
    computer code for sending an ARP announce message to the one or more destination nodes in communication with the source node, the ARP announce message including the IP address of the source node and IB address of the new source port of the source node; and
    computer code for re-balancing host traffic across the plurality of nodes.

5. A physical, non-transitory computer-readable storage medium of claim 4, further comprising computer code for identifying the one or more destination nodes in communication with the source node from a global ARP cache.

6. A physical, non-transitory computer-readable storage medium of claim 5, wherein the global ARP cache includes the first level and the second level of the ARP cache, the first level includes a plurality of IP addresses and corresponding IP over IB GUIDs of at least one other node of the plurality of nodes, and the second level includes the IP over IB GUIDs and corresponding IB addresses of at least one one other node of the plurality of nodes.

7. A physical, non-transitory computer-readable storage medium of claim 6, further comprising computer code for updating the global ARP cache to invalidate references to an address handle associated with the first source port in all entries in the global ARP cache.

8. A physical, non-transitory computer-readable storage medium of claim 4, further comprising computer code for multicasting the address of the new source port to the one or more destination nodes.

9. A physical, non-transitory computer-readable storage medium of claim 4, wherein:
the computer code for rebalancing comprises computer code for unicasting the address of the new source port to the one or more destination nodes.

10. The Infiniband system of claim 1, wherein the processor is further configured to identify from a plurality of source ports of the first node the new source port of the first node with which to receive traffic from the one or more other nodes.

11. The Infiniband system of claim 1, wherein the processor is further configured to identify the one or more other nodes in communication with the first node from a global ARP cache.

12. The Infiniband system of claim 11, wherein the global ARP cache includes the first level and the second level of the ARP cache, the first level includes a plurality of IP addresses and corresponding IP over IB GUIDs of at least one other node of the plurality of nodes, and the second level includes the IP over IB GUIDs and corresponding IB addresses of the at least one other node of the plurality of nodes.

13. The Infiniband system of claim 11, wherein the processor is further configured to update the global ARP cache to invalidate references to an address handle associated with the first port in all entries in the global ARP cache.

14. The Infiniband system of claim 1, wherein the processor is further configured to multicast the address of the new source port to the one or more destination nodes.

15. The Infiniband system of claim 1, wherein the processor is further configured to unicast the address of the new source port to the one or more destination nodes.

\* \* \* \* \*